(12) United States Patent
Angell et al.

(10) Patent No.: US 8,190,544 B2
(45) Date of Patent: *May 29, 2012

(54) IDENTIFYING AND GENERATING BIOMETRIC COHORTS BASED ON BIOMETRIC SENSOR INPUT

(75) Inventors: Robert Lee Angell, Salt Lake City, UT (US); Robert R Friedlander, Southbury, CT (US); James R Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 570 days.

This patent is subject to a terminal disclaimer.

(21) Appl. No.: 12/333,316

(22) Filed: Dec. 12, 2008

(65) Prior Publication Data

US 2010/0153470 A1     Jun. 17, 2010

(51) Int. Cl.
*G06F 17/00* (2006.01)
(52) U.S. Cl. ......................................................... 706/45
(58) Field of Classification Search ..................... 706/45
See application file for complete search history.

(56) References Cited

U.S. PATENT DOCUMENTS

| | | | |
|---|---|---|---|
| 5,664,109 A | 9/1997 | Johnson et al. | |
| 5,774,569 A | 6/1998 | Waldenmaier | |
| 6,054,928 A | 4/2000 | Lemelson et al. | |
| 6,178,141 B1 | 1/2001 | Duckworth et al. | |
| 6,242,186 B1 | 6/2001 | Salonen | |
| 6,646,676 B1 | 11/2003 | DaGraca et al. | |
| 7,308,385 B2 | 12/2007 | Wegerich et al. | |
| 7,538,658 B2 | 5/2009 | Twitchell | |
| 7,584,280 B2 | 9/2009 | Kim et al. | |
| 7,667,596 B2 | 2/2010 | Ozdemir et al. | |
| 7,683,929 B2 | 3/2010 | Elazar et al. | |
| 7,755,480 B2 | 7/2010 | Aritsuka et al. | |
| 7,840,515 B2 | 11/2010 | Ozdemir et al. | |
| 7,840,897 B2 | 11/2010 | Ancier | |
| 7,846,020 B2 | 12/2010 | Walker et al. | |
| 7,921,036 B1 | 4/2011 | Sharma et al. | |
| 7,930,204 B1 | 4/2011 | Sharma et al. | |
| 7,974,869 B1 | 7/2011 | Sharma et al. | |
| 2002/0176604 A1 | 11/2002 | Shekhar et al. | |

(Continued)

FOREIGN PATENT DOCUMENTS

KR     20080082924 A     9/2008

OTHER PUBLICATIONS

U.S. Appl. No. 12/333,321: Non-Final Office Action Mailed May 23, 2011.

(Continued)

*Primary Examiner* — Jeffrey A Gaffin
*Assistant Examiner* — Ababacar Seck
(74) *Attorney, Agent, or Firm* — John R. Pivnichny; Law Office of Jim Boice

(57) ABSTRACT

The illustrative embodiments described herein provide a computer implemented method, apparatus, and computer program product for generating biometric cohorts. In one embodiment, biometric data is received which identifies a set of biometric patterns. The biometric data is received from a set of biometric sensors. The biometric data is processed to form digital biometric data that identifies attributes of the biometric data. In addition, the digital biometric data includes metadata describing the attributes of the biometric data. Thereafter, a set of biometric cohorts is generated using the digital biometric data. Each member of the set of biometric cohorts shares at least one biometric attribute in common.

20 Claims, 4 Drawing Sheets

U.S. PATENT DOCUMENTS

| | | |
|---|---|---|
| 2002/0183971 A1 | 12/2002 | Wegerich et al. |
| 2002/0194117 A1 | 12/2002 | Nabe et al. |
| 2003/0023612 A1 | 1/2003 | Carlbom et al. |
| 2003/0088463 A1 | 5/2003 | Kanevsky et al. |
| 2003/0169907 A1 | 9/2003 | Edwards et al. |
| 2003/0174773 A1 | 9/2003 | Comaniciu et al. |
| 2004/0064341 A1 | 4/2004 | Langan et al. |
| 2004/0161133 A1 | 8/2004 | Elazar et al. |
| 2004/0225202 A1 | 11/2004 | Skinner |
| 2004/0240542 A1 | 12/2004 | Yeredor et al. |
| 2005/0018861 A1 | 1/2005 | Tashev |
| 2005/0043060 A1 | 2/2005 | Brandenberg et al. |
| 2005/0125325 A1 | 6/2005 | Chai et al. |
| 2005/0169367 A1 | 8/2005 | Venetianer et al. |
| 2006/0000420 A1 | 1/2006 | Davies |
| 2006/0004582 A1 | 1/2006 | Claudatos et al. |
| 2007/0013776 A1 | 1/2007 | Venetianer et al. |
| 2007/0230270 A1 | 10/2007 | Calhoun |
| 2008/0004951 A1 | 1/2008 | Huang et al. |
| 2008/0031491 A1 | 2/2008 | Ma et al. |
| 2008/0055049 A1 | 3/2008 | Weill et al. |
| 2008/0067244 A1 | 3/2008 | Marks |
| 2008/0082399 A1 | 4/2008 | Noble et al. |
| 2008/0240496 A1 | 10/2008 | Senior |
| 2008/0243439 A1 | 10/2008 | Runkle et al. |
| 2008/0260212 A1 | 10/2008 | Moskal et al. |
| 2008/0262743 A1 | 10/2008 | Lewis et al. |
| 2009/0070138 A1 | 3/2009 | Langheier et al. |
| 2009/0109795 A1 | 4/2009 | Marti |
| 2009/0195401 A1 | 8/2009 | Maroney et al. |
| 2010/0008515 A1 | 1/2010 | Fulton et al. |
| 2010/0131206 A1 | 5/2010 | Angell et al. |
| 2010/0131263 A1 | 5/2010 | Angell et al. |
| 2010/0131502 A1 | 5/2010 | Fordham |
| 2010/0148970 A1 | 6/2010 | Angell et al. |
| 2010/0150457 A1 | 6/2010 | Angell et al. |
| 2010/0150458 A1 | 6/2010 | Angell et al. |
| 2010/0153146 A1 | 6/2010 | Angell et al. |
| 2010/0153147 A1 | 6/2010 | Angell et al. |
| 2010/0153174 A1 | 6/2010 | Angell et al. |
| 2010/0153180 A1 | 6/2010 | Angell et al. |
| 2010/0153353 A1 | 6/2010 | Angell et al. |
| 2010/0153389 A1 | 6/2010 | Angell et al. |
| 2010/0153390 A1 | 6/2010 | Angell et al. |
| 2010/0153458 A1 | 6/2010 | Angell et al. |
| 2010/0153470 A1 | 6/2010 | Angell et al. |
| 2010/0153597 A1 | 6/2010 | Angell et al. |

OTHER PUBLICATIONS

U.S. Appl. No. 12/333,256: Non-Final Office Action Mailed May 23, 2011.

U.S. Appl. No. 12/333,256, filed Dec. 11, 2008, Angell et al.

U.S. Appl. No. 12/333,321, filed Dec. 12, 2008, Angell et al.

U.S. Appl. No. 12/333,323, filed Dec. 12, 2008, Angell et al.

U.S. Appl. No. 12/335,731, filed Dec. 16, 2008, Angell et al.

U.S. Appl. No. 12/336,440, filed Dec. 16, 2008, Angell et al.

U.S. Appl. No. 12/336,471, filed Dec. 16, 2008, Angell et al.

U.S. Appl. No. 12/336,488, filed Dec. 16, 2008, Angell et al.

U.S. Appl. No. 12/333,311, Angell et al., Final Office Action Mailed Aug. 18, 2011.

U.S. Appl. No. 12/335,731, Angell et al., Non-Final Office Action Mailed Oct. 26, 2011.

U.S. Appl. No. 12/336,488, Angell et al., Non-Final Office Action Mailed Sep. 15, 2011.

U.S. Appl. No. 12/333,273, Angell et al., Non-Final Office Action Mailed Sep. 30, 2011.

U.S. Appl. No. 12/335,857, Angell et al., Final Office Action Mailed Oct. 13, 2011.

Brown et al., "IBM Smart Surveillance System (S3): An Open and Extendible Architecture for Smart Video Surveillance", Retrieved on Jan. 12, 2009, pp. 1-4.

M. Borg et al., "Video Surveillance for Aircraft Activity Monitoring", IEEE Conference on Advanced Video and Signal Based Surveillance, 2005, pp. 16-21.

Y. Matsushita et al., "Illumination Normalization With Time-Dependent Intrinsic Images for Video Surveillance", IEEE Transactions on Pattern Analysis and Machine Intelligence, vol. 26, Issue 10, Oct. 2004, pp. 1336-1347.

J. Davis et al., "An Adaptive Focus-Of-Attention Model for Video Surveillance and Monitoring", Machine Vision and Application 18, 2007, pp. 41-64.

L. Herbert, "Othello Error: Facial Profiling, Privacy, and the Suppression of Dissent", Ohio State Journal of Criminal Law, vol. 5, 2007, pp. 79-129.

C. Larson et al., "The Shape of Threat: Simple Geometric Forms Evoke Rapid and Sustained Capture of Attention", Emotion 2007, vol. 7, No. 3, pp. 526-534.

A. Oredsson, "Cognitive Video Surveillance: An ANN/CBR Hybrid Approach", Master of Science in Informatics, Norwegian University of Science and Technology, Submitted Jun. 2007, pp. 1-136.

N. Siebel et al., "The Advisor Visual Surveillance System", Applications of Computer Vision '04, Prague, May 16, 2004, pp. 103-111.

U.S. Appl. No. 12/275,830, Specification.

U.S. Appl. No. 12/277,122, Prosecution History.

U.S. Appl. No. 12/333,273, Specification.

U.S. Appl. No. 12/333,311, Prosecution History.

U.S. Appl. No. 12/333,319, Prosecution History.

U.S. Appl. No. 12/333,326, Specification.

U.S. Appl. No. 12/335,521, Prosecution History.

U.S. Appl. No. 12/336,440, Prosecution History.

U.S. Appl. No. 12/335,857, Prosecution History.

Graham Center One-Pager, Types of Medical Errors Commonly Reported by Family Physicians, AM FAM Physician, Feb. 2003.

U.S. Appl. No. 12/275,830—Non-Final Office Action Mailed Dec. 14, 2011.

U.S. Appl. No. 12/335,521—Final Office Action Mailed Dec. 30, 2011.

Yalch et al., "The Effects of Music in a Retail Setting on Real and Perceived Shopping Times," Journal of Business Research 49, pp. 139-147, 2000.

U.S. Appl. No. 12/333,319—Final Office Action Mailed Feb. 1, 2012.

Gulas et al., "Right Under Our Noses: Ambient Scent and Consumer Responses," Journal of Business and Psychology, Fall 1995.

M. Bitner, "The Impact of Physical Surroundings on Customer and Employees," Journal of Marketing, Apr. 1992.

Knowledge@Wharton, Tag Team, "Tracking the Pattern of Supermarket Shoppers," Published Jun. 1, 2005.

Girgensohn et al., "Determining Activity Patterns in Retail Spaces Through Video Analysis," MM'08, Oct. 26-31, 2008.

U.S. Appl. No. 12/333,323—Notice of Allowance Mailed Nov. 15, 2011.

Lymberopoulos et al., "An Easy-To-Program Sensor System for Parsing Out Human Activities," Embedded Networks and Application Lab, Enalab, Yale University, New Haven, CT, 2008, pp. 1-17.

U.S. Appl. No. 12/336,471—Non-Final Office Action Mailed Nov. 17, 2011.

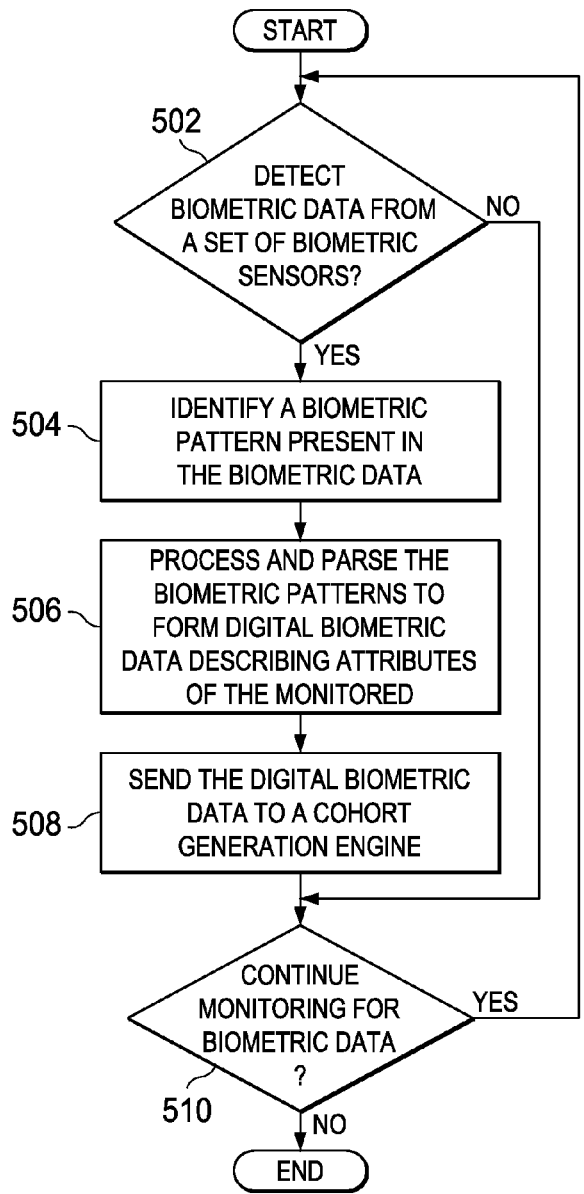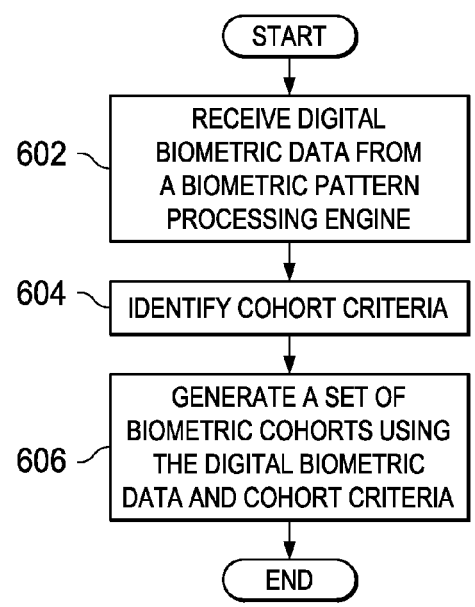

IDENTIFYING AND GENERATING BIOMETRIC COHORTS BASED ON BIOMETRIC SENSOR INPUT

BACKGROUND

The present invention relates generally to an improved data processing system and in particular to a method and apparatus for identifying and generating cohorts. Still more particularly, the present invention relates to a computer implemented method, apparatus, and computer program product for generating biometric cohorts from biometric data captured by biometric sensors.

Biometrics is a science based on the measurement and analysis of biometric data. Biometric data is data gathered from the monitoring of people, animals, or other living organisms. In particular, biometric data may include, for example, measurement and analysis of physiological characteristics, such as fingerprints, retinas and irises, facial patterns, hand measurements, heart rate, body temperature, perspiration, and respiration.

Currently, biometric data is most commonly used for identifying and authenticating individuals. The owner of a biometric identifier, such as a fingerprint or facial pattern, is first enrolled in a biometric identification system. During the enrollment process, metadata describing the biometric identifier is stored. The biometric identifier is captured by a biometric sensor. Examples of biometric sensors may include, for example, heart rate monitors, image captured devices, or other forms of sampling devices. Thereafter, the owner's identity may be verified by providing a subsequent sample of the biometric identifier for verification.

SUMMARY

The illustrative embodiments described herein provide a computer implemented method, apparatus, and computer program product for generating biometric cohorts. In one embodiment, biometric data is received which identifies a set of biometric patterns. The biometric data is received from a set of biometric sensors. The biometric data is processed to form digital biometric data that identifies attributes of the biometric data. In addition, the digital biometric data includes metadata describing the attributes of the biometric data. Thereafter, a set of biometric cohorts is generated using the digital biometric data. Each member of the set of biometric cohorts shares at least one biometric attribute in common.

BRIEF DESCRIPTION OF THE SEVERAL VIEWS OF THE DRAWINGS

FIG. 5 is a flowchart of a process for capturing biometric data in accordance with an illustrative embodiment; and FIG. 6 is a flowchart of a process for generating biometric cohorts based on biometric data in accordance with an illustrative embodiment.

DETAILED DESCRIPTION

Figure 1:
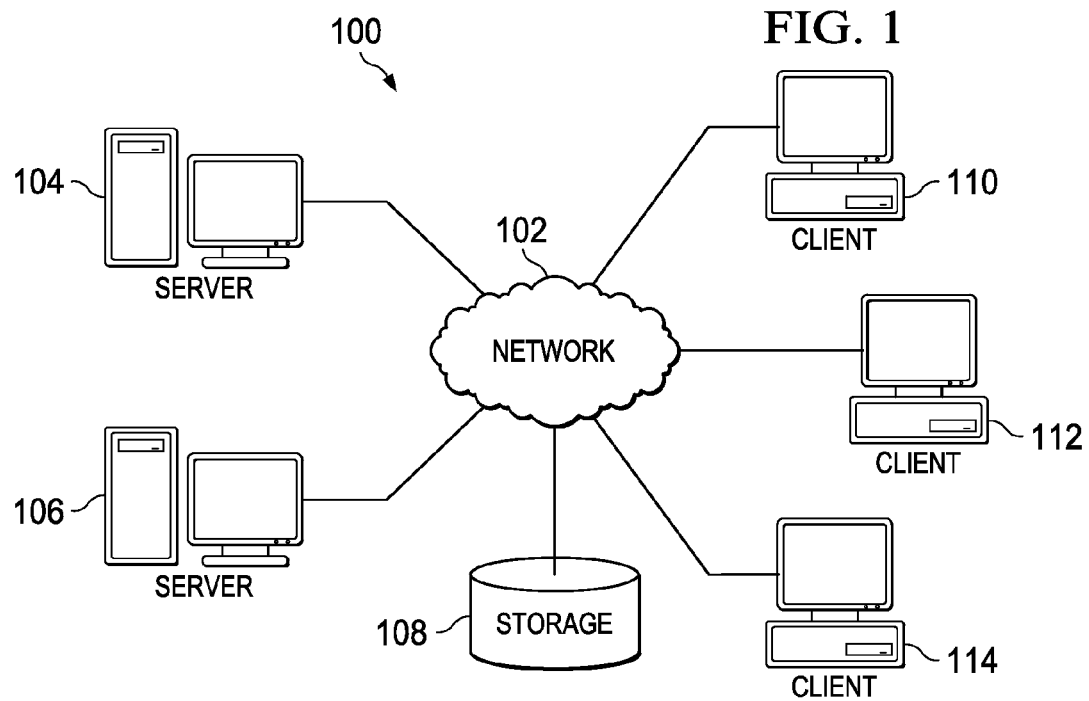
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
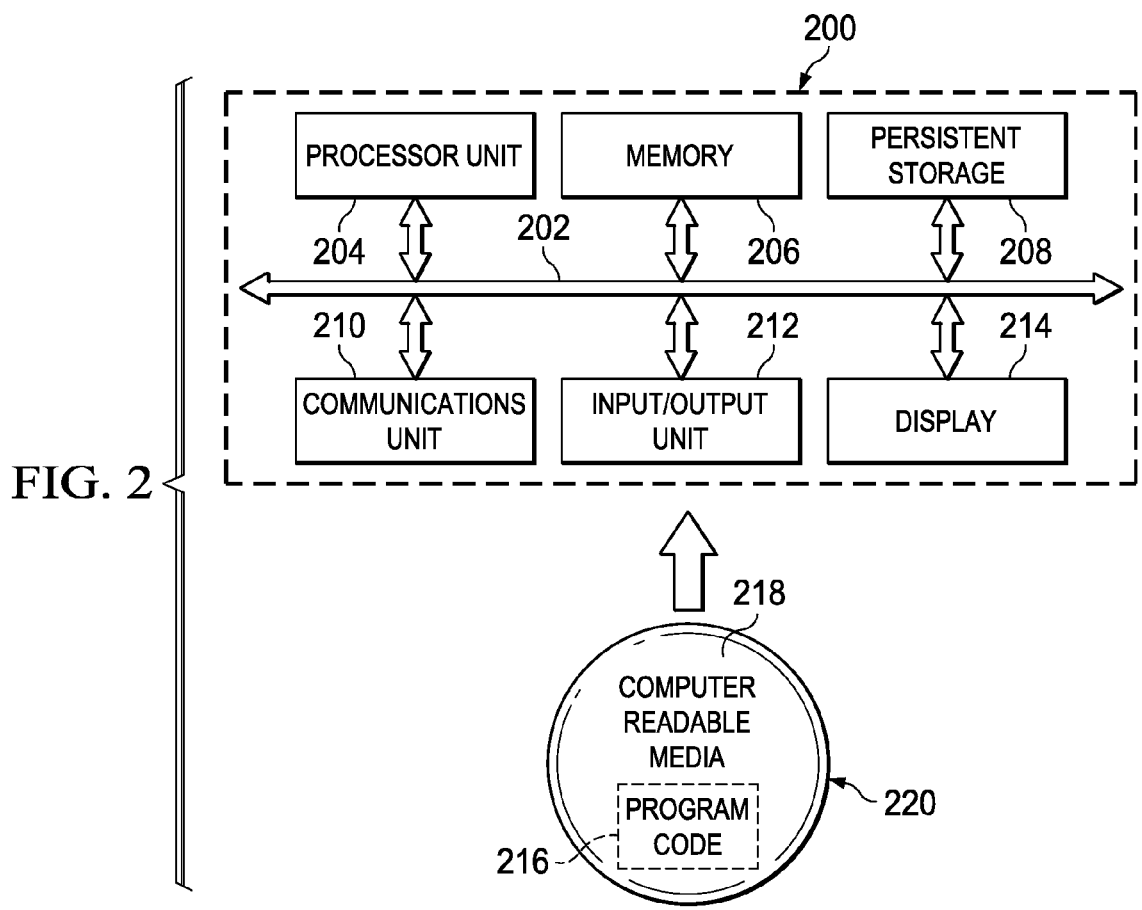
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In an illustrative example, a client computer, such as client 110, may host a biometric pattern processing engine and a cohort generation engine for generating a set of biometric cohorts. The biometric cohorts includes one or more monitored subjects. The biometric cohorts may be generated from biometric data received from a set of biometric sensors, such as set of biometric sensors 310 in FIG. 3. In addition, the client computer may also host an inference engine for generating inferences related to the set of biometric cohorts.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Biometric data may be collected by simple observation. For example, common biometric data listed on a driver's license includes physical attributes. Physical attributes are characteristics that are readily observable, and include, for example, height, weight, and hair color. Cohorts formed from these types of biometric data may be limited in its usefulness. However, more robust biometric cohorts may be generated by taking into consideration more or different attributes, such as behavioral attributes. Behavioral attributes are characteristics of cohort members that are observable over time and describe habits and/or behavior. Examples of behavioral attributes include, for example, gait, speech patterns, manner of generating a signature, and reaction to certain stimuli.

Cohorts are often generated based upon the selection of one or more attributes shared by members of the cohort. Thus, each member of a biometric cohort shares at least one biometric attribute in common. The information used to identify the attributes of members of the cohorts is typically provided by the members of the cohort. However, this information may be voluminous, dynamically changing, unavailable, and/or unknown to the members of the cohort or the entity selecting members of a cohort group. Moreover, it may be difficult, time consuming, or impractical for an entity to access all of the information necessary to accurately generate cohorts. In addition, unique cohorts are typically sub-optimal because cohort creators lack the skills, time, knowledge, and/or expertise needed to gather cohort attribute information from available sources.

The illustrative embodiments disclosed herein recognize that biometric data collected by biometric sensors can be used to generate biometric cohorts populated with members sharing common attributes. A biometric cohort is a group of members who share at least one common attribute. Members of a cohort may be humans, animals, plants, or places populated with forms of living organisms. Cohorts may be used in research, marketing, safety studies, and many other various uses.

Therefore, in one embodiment of the present invention, a computer implemented method, apparatus, and computer program product is provided for generating biometric cohorts. A biometric cohort is a group of members who share one or more common biometric attributes. The common biometric attributes may be identified from patterns present in biometric data captured by a set of biometric sensors. As used herein, the term "set" may refer to one or more. Thus, a set of biometric sensors may be a set formed from a single sensor, or two or more sensors.

The biometric data captured by the set of biometric sensors describes a set of biometric patterns of a monitored subject. The biometric data, which is captured in an analog format or a digital format, is processed and transformed into a digital format for use in a biometric cohort generation engine. If the biometric data is captured in an analog format, the analog format is converted into a digital format. The biometric cohort generation engine receives the digital biometric data and generates cohorts from the biometric patterns in accordance with cohort criteria. In one embodiment, the biometric cohort may be used in a system-wide monitoring process to quickly and efficiently pass vital information to a real-time computational process. Thus, the embodiments permit a user to create biometric cohorts based on biometric data describing characteristics of one or more monitored subjects. Biometric cohorts are groups of members who are selected based upon one or more common attributes. Examples of attributes include, for example, skin tone, body geometry, body type, body temperature, eye color, weight, or any other attribute.

The illustrative embodiments described herein provide a computer implemented method, apparatus, and computer program product for generating biometric cohorts. In one embodiment, biometric data is received which identifies a set of biometric patterns. The biometric data is received from a set of biometric sensors in an analog format. The biometric data is processed to form digital biometric data that identifies attributes of the biometric data. In addition, the digital biometric data includes metadata describing the attributes of the biometric data. Thereafter, a set of biometric cohorts is generated using the digital biometric data.

Figure 3:
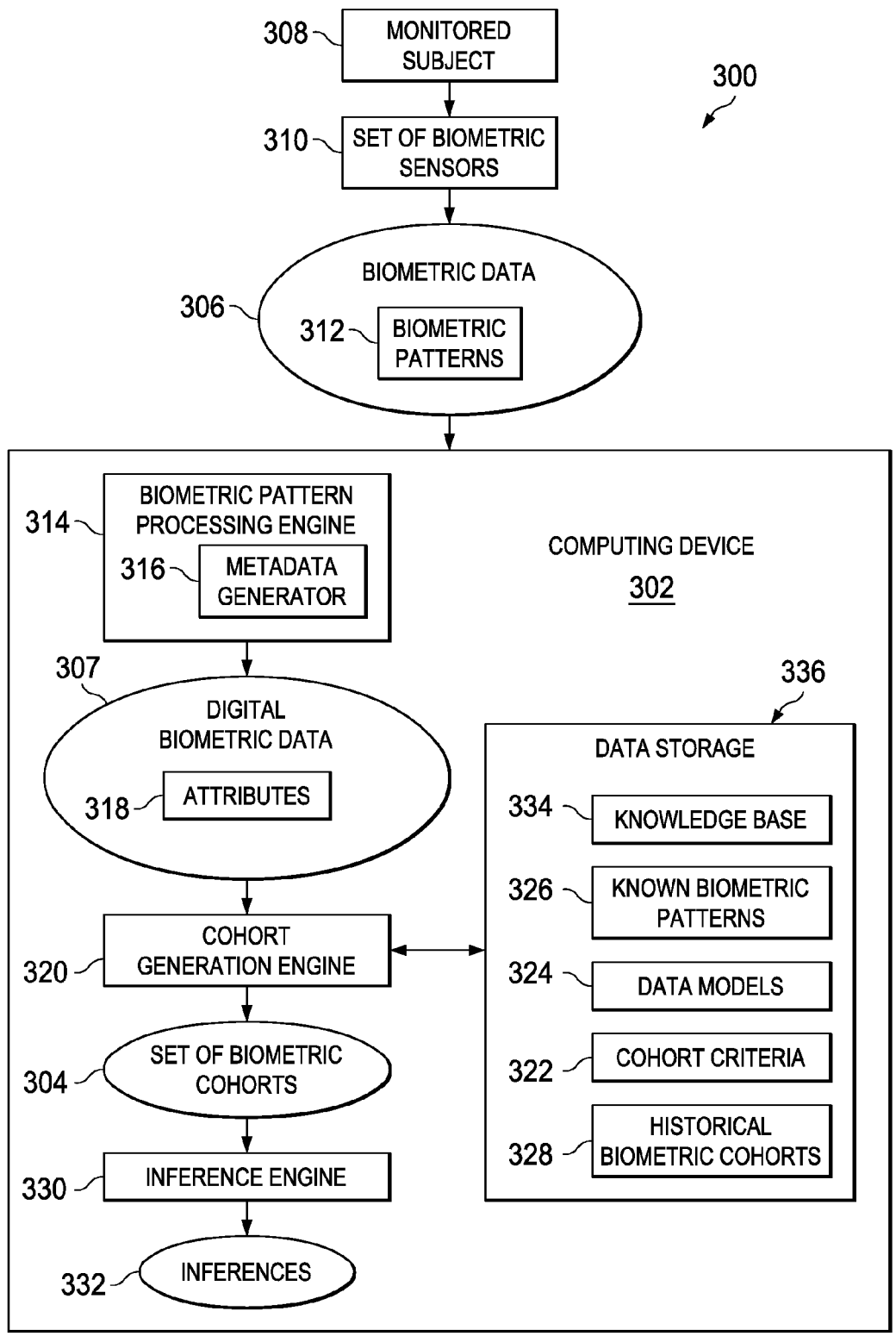
FIG. 3 is a block diagram of a biometric data processing system in accordance with an illustrative embodiment.

FIG. 3 is a block diagram of a biometric data processing system in accordance with an illustrative embodiment. The components depicted in system 300 are components of a networked data processing system, such as networked data processing system 100 in FIG. 1. For example, computing device 302 of system 300 may be implemented using any type of computing device, including, but not limited to, a main frame, a server, a personal computer, a laptop, a personal digital assistant (PDA), or any other computing device depicted in FIGS. 1 and 2.

System 300 is configured for generating set of biometric cohorts 304. Set of biometric cohorts 304 is a group of members having one or more common attributes. Examples of biometric cohorts included in set of biometric cohorts 304 may include, for example, members that have a similar body geometry, heart rate, body mass index, or other biometric attributes. Set of biometric cohorts 304 is generated from biometric data 306. Biometric data 306 is analog data gathered from the monitoring of people, plants, animals, or locations in which living organisms are present. Biometric data 306 may include, for example, measurement and analysis of physiological characteristics, such as fingerprints, retinas and irises, facial patterns, hand measurements, heart rate, body temperature, perspiration, and respiration. Biometric data 306 may also include measurement and analysis of behavioral characteristics, such as gait, speech patterns, and reaction to certain stimuli.

Biometric data 306 is collected from monitored subject 308. Monitored subject 308 is one or more members of a population, such as people or animals, identified for inclusion in set of biometric cohorts 304. Biometric data 306 is collected from monitored subject 308 by set of biometric sensors 310. Set of biometric sensors 310 is one or more sensors for measuring and/or detecting biometric readings of monitored subject 308. The set of biometric sensors referenced herein may include, for example, at least one of an image capture device, an audio capture device, an odor detection device, a heart monitor, a blood pressure monitor, a thermometer or other device for measuring body temperature, a fingerprint scanner, a thumbprint scanner, a palm scanner, a retinal scanner, an iris scanner, a breathalyzer, a microphone capable of detecting a heart beat and/or breath sounds, a respiratory monitor, a fetal heart monitor, a blood sugar monitor, or any existing or later developed sampling device. As used herein, the term "at least one of", when used with a list of items, means that different combinations of one or more of the items may be used and only one of each item in the list may be needed. For example, "at least one of item A, item B, and item C" may include, for example, without limitation, item A, or item A and item B. This example also may include item A, item B, and item C, or item B and item C. Thus, the biometric sensors may include an image capture device, an audio capture device, an odor detection device, a sampling device, or any combination thereof.

A sampling device is a generic biometric sensing device that captures samples of biometric data. For example, a heart rate sensor is a sampling device that captures samples of a monitored subject's heartbeat to determine a heart rate. The sampling device may capture biometric data at a first time interval and then capture a second biometric data at a second time interval. The biometric data collected at both the first and the second time intervals may then be processed in a manner that describes one or more attributes of a monitored subject. For example, a respiration sampling device may determine a monitored subject has a resting respiration rate of twelve breaths a minute. At a second time interval, immediately following a brisk walk, the monitored subject may have a respiration rate of thirty breaths a minute. The change in respiration rate may serve as an attribute by which a biometric cohort may be generated.

Biometric data 306 includes biometric patterns 312. Biometric patterns 312 is a pattern of data exhibited by and/or relating to monitored subject 308. For example, biometric patterns 312 may be a pattern of body types present at a monitored location. Biometric patterns 312 may also be behavior exhibited by monitored subject 308. Biometric patterns 312 may be used to identify a particular monitored subject.

Biometric data 306 is sent to computing device 302 for generating set of biometric cohorts 304. Specifically, once received by computing device 302, biometric data 306 is processed by biometric pattern processing engine 314. Biometric pattern processing engine 314 is a software application for processing biometric data 306 to form digital biometric data 307. Digital biometric data 307 is biometric data in digital format. In addition, digital biometric data 307 includes metadata describing biometric pattern 312, which may also be used for identifying and describing a monitored subject, such as monitored subject 308.

Biometric pattern processing engine 314 includes metadata generator 316. Metadata generator 316 is software for generating metadata describing biometric pattern 312 that form attributes 318. In this manner, the biometric patterns depicted in biometric data 306 may form attributes 318 upon which biometric cohorts from set of biometric cohorts 304 are generated. The metadata describing attributes 318 is included in digital biometric data 307.

Digital biometric data 307 includes attributes 318. Attributes 318 are one or more characteristics, features, or other property of a monitored subject. Attributes 318 of a monitored subject may describe or identify biometric patterns, such as biometric patterns 312. In addition, attributes 318 may be used to determine the identity of monitored subject 308. Attributes 318 may be behavioral attributes or physical attributes. Behavioral attributes are attributes that describe habits or behavior of a monitored subject. Physical attributes are attributes that describe the appearance of a monitored subject.

Biometric pattern processing engine 314 passes digital biometric data 307 to cohort generation engine 320 for generating set of biometric cohorts 304. Cohort generation engine 320 is a software program configured for generating biometric cohorts. In an alternate embodiment, cohort generation engine 320 may request digital biometric data 307 from a data storage device where biometric data is stored. In other embodiments, biometric pattern processing engine 314 automatically sends digital biometric data 307 to cohort generation engine 320 in real time as digital biometric data 307 is generated. In addition, another embodiment may have biometric pattern processing engine 314 send digital biometric data 307 to cohort generation engine 320 upon the occurrence of a predetermined event. The predetermine event may be the expiration time, completion of task, such as processing biometric data 306, occurrence of a timeout event, a user request, or any other predetermined event. Thus, the illustrative embodiments may utilize digital biometric data 307 in real time as digital biometric data 307 is generated. The illustrative embodiments may also utilize digital biometric data 307 that is pre-generated and/or stored in a data storage device until the digital biometric data is retrieved at some later time.

Cohort generation engine 320 generates set of biometric cohorts 304 with reference to attributes 318 described by metadata provided by metadata generator 316. In addition, cohort generation engine 320 references cohort criteria 322 in generating set of biometric cohorts 304. Cohort criteria 322 is a set of criteria and/or guidelines for generating set of biometric cohorts 304. Cohort criteria 322 specifies a grouping of members into cohorts based upon predefined attributes such as, for example, body geometry, body mass index, height, weight, blood pressure, hair color, heart rate, pheromone level, and behavioral tendencies. For example, cohort criteria 322 may specify that a particular cohort group included in set of biometric cohorts 304 should include all people having a body mass index within a predetermined range, or all animals having a certain pheromone level.

Cohort generation engine 320 may optionally process digital biometric data 307 in data models 324. Data models 324 are a set of one or more data models for processing biometric data 306 and identifying attributes of monitored subject 308. A data model is a model for structuring, defining, organizing, imposing limitations or constraints, and/or otherwise manipulating data and metadata to produce a result. A data model may be generated using any type of modeling method or simulation including, but not limited to, a statistical model, a data mining model, a causal model, a mathematical model, a marketing model, a behavioral model, a psychological model, a sociological model, or a simulation model.

In one embodiment, digital biometric data 307 is processed using one or more data models to create set of biometric cohorts 304. For example, a data model from data models 324 may be used to identify biometric patterns exhibited by customers in a retail environment. This information may then be used to create cohorts of customers having similar attributes. In this example, cohorts of customers having a particular body type may be provided with incentives for purchasing a particular type of clothing that is overstocked and out of style.

Cohort generation engine 320 generates set of biometric cohorts 304 using cohort criteria 322 and optionally, the results of processing digital biometric data 307 in data models 324 and/or comparisons of digital biometric data 307 with known biometric patterns 326. Known biometric patterns 326 are patterns derived from biometric data which are exhibited by monitored subjects over time. In one embodiment, cohort generation engine 320 compares biometric patterns 312 of monitored subject 308 with known biometric patterns 326 for comparison. A particular biometric pattern may be compared to known biometric patterns 326. If a match is found, the matching biometric pattern may be used to identify attributes of the monitored subject. In addition, cohort generation engine 320 may reference historical biometric cohorts 328 in the processing of digital biometric data 307. Historical biometric cohorts 328 are a set of one or more biometric cohorts identified from biometric data captured from monitored subjects over time. Thus, for example, if biometric data 306 is collected from a single subject, such as monitored subject 308, cohort generation engine 320 may determine whether monitored subject 308 may be grouped into a pre-existing biometric cohort described in historical biometric cohorts 328.

In one embodiment, cohort generation engine 320 provides set of biometric cohorts 304 to inference engine 330. Inference engine 330 is a software component, such as a computer program, that derives inferences 332 based upon input, such as set of biometric cohorts 304. Inferences 332 are conclusions regarding possible future events or future changes in the attributes of cohorts that are drawn or inferred. Inferences 332 are derived in accordance with knowledge base 334. Knowledge base 334 is a collection of facts, criteria, factors, and other information used to generate inferences 332. Knowledge base 334 is depicted as being stored in data storage 336. However, in other embodiments, knowledge base 334 may be stored in one or more remote data storage devices that may be accessed over a network connection.

For example, set of biometric cohorts 304 may be analyzed by inference engine 330 to determine a cohort of individuals that would likely be more expensive to insure based upon a body type, blood pressure readings, rate of respiration, or other biometric readings. For example, inference engine 330 may have access to information stored in knowledge base 334 indicating that individuals with high blood pressure are more likely to suffer medical complications. Thus, if inference engine 330 detects a cohort of members having high blood pressure, then in one example, inferences 332 may be presented to an insurance company for setting insurance rates. In yet another example, inference engine 330 may receive a set of biometric cohorts from members at a gym. Based upon the digital biometric data used to generate the set of biometric cohorts of the gym members, inference engine 330 may infer a cohort of gym members that may be using banned substances based upon an abnormal increase in muscle mass.

In this example in FIG. 3, set of biometric sensors 310 is implemented as a separate device than computing device 302. However, in other embodiments, set of biometric sensors 310 may be embodied within a single device. Similarly, computing device 302 includes data storage 336. Data storage 336 is a device for storing data. Data storage 336 may be, for example, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device. In an alternate embodiment, data storage 336 may be located in a remote location accessible to computing device 302 via a network, such as network 102 in FIG. 1.

Figure 4:
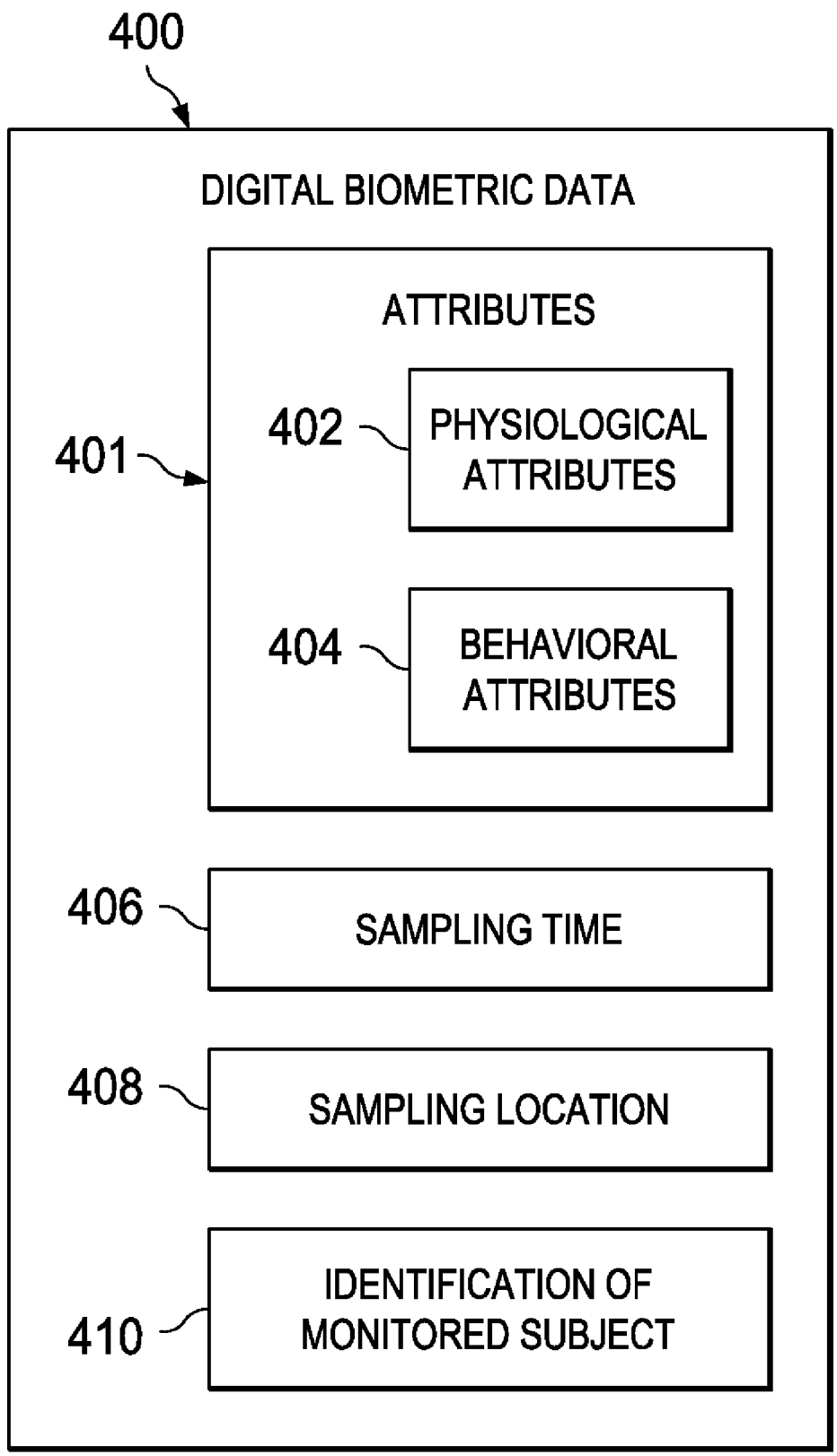
FIG. 4 is a block diagram of digital biometric data generated from biometric data captured by a set of biometric sensors in accordance with an illustrative embodiment.

FIG. 4 is a block diagram of digital biometric data generated from biometric data captured by a set of biometric sensors in accordance with an illustrative embodiment. Digital biometric data 400 is digital biometric data, such as digital biometric data 307 in FIG. 3. In addition, digital biometric data 400 may be captured by a set of biometric sensors, such as set of biometric sensors 310 in FIG. 3.

Digital biometric data 400 is data converted to digital format from biometric data collected from a set of sensors in analog format. In addition, digital biometric data 400 includes metadata describing set of attributes 401 for one or more monitored subjects, such as monitored subject 308 in FIG. 3. Set of attributes 401 are attributes, such as attributes 318 in FIG. 3. Set of attributes 401 may include, for example, physiological attributes 402. Physiological attributes 402 are one or more attributes of a set of monitored subjects.

Examples of physiological attributes 402 may include, without limitation, a monitored subject's resting heart rate, blood pressure, finger print pattern, voice print, respiration rate, or body temperature.

Set of attributes 401 may also include behavioral attributes 404. Behavioral attributes 404 are one or more attributes of a set of monitored subjects relating to a common behavior. For example, behavioral attributes 404 may include metadata describing the monitored subject's gait. The monitored subject may take long, slow strides, or short, quick strides. Behavioral attributes 404 may also include reactions to observable stimuli. For example, behavioral attributes 404 may describe a monitored subject's increase in heart rate after consuming caffeine, or a reaction to a medication.

Digital biometric data 400 may also include other types of data for giving context to the attributes included therein. For example, digital biometric data 400 may include sampling time 406. Sampling time 406 may indicate a date and/or time that digital biometric data 400 is collected. Biometric data, such as heart rate, respiration, and perspiration may vary daily based upon the time of collection. Thus, such information may be useful in generating biometric cohorts. In addition, digital biometric data 400 may include sampling location 408. Sampling location 408 may indicate the location in which biometric data is collected. Sampling location 408 may indicate circumstances that may be affecting the biometric data collected by a set of sensors. For example, biometric data collected from a monitored subject in a classroom may differ from biometric data collected from the monitored subject in a crowded subway station.

Digital biometric data 400 may also include identification of monitored subject 410. Identification of monitored subject 410 is metadata identifying a monitored subject, such as monitored subject 308 in FIG. 3. A monitored subject may be identified based upon a comparison of the biometric data collected from the monitored subject, such as biometric data 306 in FIG. 3, and stored biometric data derived from a prior enrollment of the monitored subject.

FIG. 5 is a flowchart of a process for capturing biometric data in accordance with an illustrative embodiment. The process depicted in FIG. 5 may be implemented in software, such as biometric pattern processing engine 314 in FIG. 3.

The process begins by making a determination as to whether biometric data from a set of biometric sensors is detected (step 502). If the process makes the determination that biometric data from the set of biometric sensors is detected, the process identifies a biometric pattern present in the biometric data (step 504). Examples of biometric patterns that may be present in the biometric data may include, for example, a common physiological reaction to the same stimulus, a heart rate within a particular range, a specific body shape, or some other type of biometric pattern from biometric data.

The biometric patterns are processed and parsed to form digital biometric data describing attributes of the monitored subjects (step 506). The process then sends the digital biometric data to a cohort generation engine (step 508) before making a determination as to whether monitoring for biometric data should be continued (step 510). If the process makes the determination that monitoring for biometric data should be continued, the process returns to step 502. However, if the process makes the determination that monitoring for biometric data should not be continued, the process terminates.

Returning to step 502, if the process makes the determination that biometric data from a set of biometric sensors is not detected, the process continues to step 510.

FIG. 6 is a flowchart of a process for generating biometric cohorts based on biometric data in accordance with an illustrative embodiment. The process in FIG. 6 may be may be implemented in a software component, such as cohort generation engine 320 in FIG. 3.

The process begins by receiving digital biometric data from a biometric pattern processing engine (step 602). The digital biometric data is digital biometric data, such as digital biometric data 307 in FIG. 3. In addition, the biometric pattern processing engine is a biometric pattern processing engine, such as biometric pattern processing engine 314 in FIG. 3.

The process then identifies the cohort criteria (step 604). The process generates a set of biometric cohorts using the digital biometric data with reference to the cohort criteria (step 606), and the process terminates thereafter. The set of biometric cohorts may include one or more biometric cohorts. Thereafter, depending upon the particular implementation, the set of biometric cohorts may be sent to an inference engine for generating inferences based upon the set of biometric cohorts.

Thus, the illustrative embodiments described herein provide a computer implemented method, apparatus, and computer program product for generating biometric cohorts. In one embodiment, biometric data is received which identifies a set of biometric patterns. The biometric data is received from a set of biometric sensors in an analog format. The biometric data is processed to form digital biometric data that identifies attributes of the biometric data. In addition, the digital biometric data includes metadata describing the attributes of the biometric data. Thereafter, a set of biometric cohorts is generated using the digital biometric data.

The biometric cohorts generated by the method and apparatus disclosed above enable the grouping of members into cohorts having similar attributes. The biometric cohorts are formed from the capture of biometric data from monitored subjects. Once formed, the biometric cohorts may then be included in a system-wide monitoring process to quickly and efficiently pass vital information to a real-time computational process. The generation of biometric cohorts, in the manner described above, obviates the need for manual selection of cohort attributes, thereby allowing the generation of more robust biometric cohorts. Once formed, the biometric cohorts may be used, for example and without limitation, in sales, marketing, marketing research, medical and diagnostic research, public health, demographic research, marketing trends, and safety and/or security applications.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for generating biometric cohorts, the computer implemented method comprising:
   receiving biometric data identifying a set of biometric patterns, wherein the biometric data is received from a set of biometric sensors;
   processing the biometric data to form digital biometric data, wherein the digital biometric data identifies attributes of the biometric data, and wherein the digital biometric data comprises metadata describing the attributes of the biometric data; and
   generating a set of biometric cohorts using the digital biometric data, wherein each member of the set of biometric cohorts shares at least one biometric attribute in common.

2. The computer implemented method of claim 1, wherein the set of biometric sensors comprises at least one of an image capture device, an audio capture device, an odor detection device, and a sampling device.

3. The computer implemented method of claim 1, further comprising:
   identifying a monitored subject from the attributes of the biometric data.

4. The computer implemented method of claim 1, wherein processing the biometric data further comprises:
   identifying at least one of a behavioral attribute and a physical attribute of a monitored subject.

5. The computer implemented method of claim 1, wherein the biometric data is a first set of biometric data generated at a first time interval, and wherein the computer implemented method further comprises:
   receiving a second set of biometric data taken at a second time interval; and
   processing the first set of biometric data and the second set of biometric data to generate the digital biometric data, wherein the digital biometric data describes the attributes of a monitored subject.

6. The computer implemented method of claim 1, further comprising:
   receiving the set of biometric cohorts by an inference engine; and
   processing the set of biometric cohorts by the inference engine for generating a set of inferences.

7. The computer implemented method of claim 1, wherein generating the set of biometric cohorts further comprises:
   analyzing the digital biometric data using at least one of cohort criteria and a set of cohort generation data models, by a cohort generation engine, to identify the set of biometric cohorts.

8. The computer implemented method of claim 1, wherein generating the set of biometric cohorts further comprises:
   responsive to receiving the biometric data in an analog format, converting the biometric data from the analog format into a digital format.

9. A computer program product for generating biometric cohorts, the computer program product comprising:
- a non-transitory computer recordable-type medium;
- first program instructions for receiving biometric data identifying a set of biometric patterns, wherein the biometric data is received from a set of biometric sensors;
- second program instructions for processing the biometric data to form digital biometric data, wherein the digital biometric data identifies attributes of the biometric data, and wherein the digital biometric data comprises metadata describing the attributes of the biometric data;
- third program instructions for generating a set of biometric cohorts using the digital biometric data, wherein member of the set of biometric cohorts shares at least one biometric attribute in common; and
- wherein the first program instructions, the second program instructions, and the third program instructions are stored on the non-transitory computer recordable-type medium.

10. The computer program product of claim 9, wherein the set of biometric sensors comprises at least one of an image capture device, an audio capture device, an odor detection device, and a sampling device.

11. The computer program product of claim 9, further comprising:
- fourth program instructions for identifying at least one of a behavioral attribute and a physical attribute of a monitored subject, wherein the fourth program instructions are stored in the non-transitory computer recordable-type medium.

12. The computer program product of claim 9, further comprising:
- fourth program instructions for identifying at least one of a behavioral attribute and a physical attribute of a monitored subject, wherein the fourth program instructions are stored in the non-transitory computer recordable-type medium.

13. The computer program product of claim 9, wherein the biometric data is a first set of biometric data generated at a first time interval, and wherein the computer program product further comprises:
- fourth program instructions for receiving a second set of biometric data taken at a second time interval;
- fifth program instructions for processing the first set of biometric data and the second set of biometric data to generate the digital biometric data, wherein the digital biometric data describes the attributes of a monitored subject; and
- wherein the fourth program instructions and the fifth program instructions are stored in the non-transitory computer recordable-type medium.

14. The computer program product of claim 9, further comprising:
- fourth program instructions for receiving the set of biometric cohorts by an inference engine;
- fifth program for processing the set of biometric cohorts by the inference engine for generating a set of inferences; and
- wherein the fourth program instructions and the fifth program instructions are stored on the non-transitory computer recordable-type medium.

15. The computer program product of claim 9, wherein the third program instructions for generating the set of biometric cohorts further comprises:
- instructions for analyzing the digital biometric data using cohort criteria, by a cohort generation engine, to identify the set of biometric cohorts.

16. The computer program product of claim 9, wherein the third program instructions for generating the set of biometric cohorts further comprises:
- instructions for analyzing the digital biometric data in a set of cohort generation data models, by a cohort generation engine, to identify the set of biometric cohorts.

17. An apparatus for generating biometric cohorts, the apparatus comprising:
- a bus system;
- a memory connected to the bus system, wherein the memory includes computer usable program code; and
- a processing unit connected to the bus system, wherein the processing unit executes the computer usable program code to receive biometric data identifying a set of biometric patterns, wherein the biometric data is received from a set of biometric sensors; process the biometric data to form digital biometric data, wherein the digital biometric data identifies attributes of the biometric data, and wherein the digital biometric data comprises metadata describing the attributes of the biometric data; and generate a set of biometric cohorts using the digital biometric data, wherein member of the set of biometric cohorts shares at least one biometric attribute in common.

18. The apparatus of claim 17, wherein the processing unit further executes the computer usable program code to analyze the digital biometric data using cohort criteria to identify the set of biometric cohorts.

19. A system for generating biometric cohorts, the system comprising:
- a set of biometric sensors, wherein the set of biometric sensors captures biometric data, and wherein the biometric data comprises a set of biometric patterns;
- a biometric pattern processing engine, wherein the biometric pattern processing engine forms digital biometric data from the biometric data; and
- a cohort generation engine, wherein the cohort generation engine generates a set of biometric cohorts from the digital biometric data, wherein each biometric cohort in the set of biometric cohorts comprises members who share at least one biometric attribute in common.

20. The system of claim 19, further comprising:
- an inference engine, wherein the inference engine generates inferences from the set of biometric cohorts.

* * * * *